United States Patent [19]

Koorneef et al.

[11] 3,855,629

[45] Dec. 17, 1974

[54] COMBINED MAGNETIC HEAD FOR RECORDING AND PLAYBACK HAVING ADJUSTABLE END FACES

[75] Inventors: Jacob Koorneef; Jan Antoon Ludolf Potgiesser; Anthonie Walraven, all of Emmasingel, Eindhoven, Netherlands

[73] Assignee: U.S. Philips Corporation, New York, N.Y.

[22] Filed: June 21, 1973

[21] Appl. No.: 372,281

[30] Foreign Application Priority Data

July 26, 1972 Netherlands ....................... 7210322

[52] U.S. Cl. ................. 360/113, 360/119, 360/122, 360/125

[51] Int. Cl. ............................................. G11b 5/22

[58] Field of Search ........... 179/100.2 CH, 100.2 C; 340/174.1 F; 346/74 MC; 360/119, 122, 128, 125, 113

[56] References Cited

UNITED STATES PATENTS

| | | | |
|---|---|---|---|
| 2,902,544 | 9/1959 | Barry | 179/100.2 C |
| 3,171,107 | 2/1965 | Rogers, Jr. | 340/174.1 F |
| 3,384,881 | 5/1968 | Frost et al. | 179/100.2 C |
| 3,493,694 | 2/1970 | Hunt | 340/174.1 F |
| 3,686,467 | 8/1972 | Camras | 179/100.2 CH |
| 3,706,861 | 12/1972 | Giel | 360/103 |

*Primary Examiner*—Alfred H. Eddleman
*Attorney, Agent, or Firm*—Frank R. Trifari

[57] ABSTRACT

A magnetic head for recording information on a track having a first width and playing back information from a track having a second smaller width which is adjusted by moving the end faces of the poleshoes of the head in the transverse direction relative to each other. The movement is preferably produced by means of, for example, an electrostrictive bending element the passive part of which is formed by a part of the head core.

7 Claims, 5 Drawing Figures

COMBINED MAGNETIC HEAD FOR RECORDING AND PLAYBACK HAVING ADJUSTABLE END FACES

The invention relates to a magnetic head for recording information on a track having a first width of a magnetisable recording medium and playing back information on a track having a second smaller width of a magnetisable recording medium, comprising a core of a magnetisable material which is provided with an electric winding and which on the side which is destined for cooperation with a recording medium, is provided with two oppositely located end faces which enclose a recording gap.

In certain systems for data storage the recording medium consists, for example, of a strip; of magnetisable material whch is provided on a carrier, for example, a tape or a disc. The information may be recorded in the form of bits and played back by means of a magnetic head. When the magnetic head is energized by electric pulses supplied to the winding, a magnetic field is produced at the area of the recording gap which is capable of magnetising the part of the recording medium present opposite to the recording gap. The magnetic head is operative over a given width of the medium, the so-called track, a device being present to produce a relative movement of the medium relative to the head so as to be able to record information throughout the length of the medium. When information is stored on a given track, all data, possibly recorded earlier on said track, are erased before the new information is recorded.

It is possible, however, that as a result of a wrong positioning of the head relative to the desired track, the bits recorded during a preceding recording operation, are not erased entirely. When during a playback operation the head is not positioned quite correctly either and such a track of earlier recorded information is scanned, the non-erased bits will also be played back.

A solution to the above problem has been sought by using a magnetic head combination which records a track with a width which is larger than the width over which there is played back. Also in the case of a positioning which is not quite correct, the playback track then falls entirely within the last written track.

An example of such a solution is known from the U.S. Pat. No. 3,171,107. In the head described in said patent, two blocks of magnetic material are present in the recording gap, each block having a length which is smaller than the overall dimension of the gap in said direction. The blocks are present on the two ends of the gap. During a recording operation the material of the blocks is saturated so that recording is carried out throughout the full gap. During a playback operation the material of the blocks is not saturated and only information is played back over the part of the gap between the two blocks.

A drawback of this known head is, however, that the operation is little effective. The head is to be considered as one central head which is flanked by two extra heads. When during playback the gaps of the extreme heads are short-circuited, the gap of the central head will also be partly short-circuited due to the magnetic coupling inevitably present between the central head and the extreme heads.

It is the object of the invention to provide a construction of a single gap magnetic head for recording information on a wide track and playing back information on a narrow track which does not exhibit the above-mentioned drawback.

For that purpose, the magnetic head according to the invention is characterized in that the end faces of the core which enclose the recording gap can be moved past each other.

The operation of this head is based on the fact that the width over which a recording gap is operative depends upon the region over which the gap is bounded on either side by magnetic material. In other words: when the two end faces which are formed by the pole faces of two pole shoes in a direction at right angles to the direction of travel of the tape are moved relative to each other, the width of the track which can be recorded and played back, respectively, varies.

The head may be used so that upon recording information the end faces of the pole shoes are positioned entirely opposite to each other and that preceding a playback operation the pole shoes are shifted so far relative to each other that the distance over which the end faces are still present opposite to each other is equal to the width over which information of a recording track is to be played back.

The movement of the end faces relative to each other can be realized in various manners within the scope of the present invention. For example, a construction is possible in which the pole shoes are moved relative to each other by influencing by means of thermal energy, light or magnetostriction of the geometric dimensions of the material which supports the core of the magnetic head.

A preferred embodiment of the magnetic head according to the invention, however, is characterized in that one or more electromechanical, preferably electrostrictive, transducers are present to move the end faces past each other. The desired relative movement of the pole shoes can in particular be realized in a simple manner by constructing the core of the magnetic head as the passive part of an electrostrictive bending element.

The invention will be described in detail, by way of example, with reference to the drawing.

Figure 1:
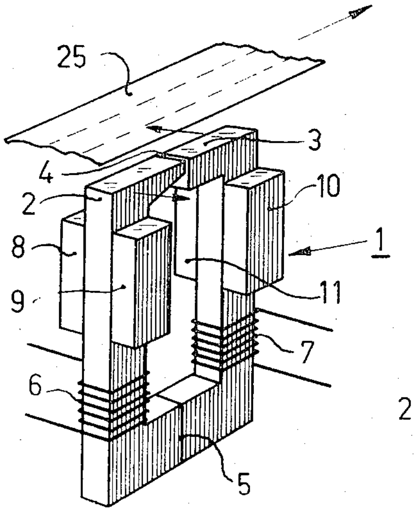
FIG. 1 shows a magnetic head according to the invention.

FIG. 1 shows a magnetic head 1 according to the invention. The head 1 consists of two core parts 2 and 3, which generally have a U-shaped cross-section and which enclose between their end faces a recording gap 4 and a rear gap 5. The core part 2 comprises an electric winding 6, for example, for recording information, and the core part 3 comprises an electric winding 7, for example for playing back information. Energisation of the recording winding causes a magnetic flux in the core parts 2 and 3 and the gaps 4 and 5. A part of the flux thus produced becomes scattered near the gap 4 and can thus influence the magnetisable medium 25. Conversely, the flux which is produced by a magnetized part of the medium 25 when the head and the medium are moved relative to each other may produce a varying magnetic flux within the playback winding so that a voltage is induced in the playback winding.

According to the invention, the head 1 is constructed so that the width over which it can play back information is smaller than the width over which it can record information since the core parts 2 and 3 at the area of the gap 4 are movable relative to each other. This effect is realized in that plates 8 and 9 of electrostrictive material are secured on either side of the core part 2 which plates together with the core part 2 form a bending element, and in that plates 10 and 11 of electrostrictive material are secured to the core parts 3 which in turn together with the core part 3 form a bending element.

Figure 2:
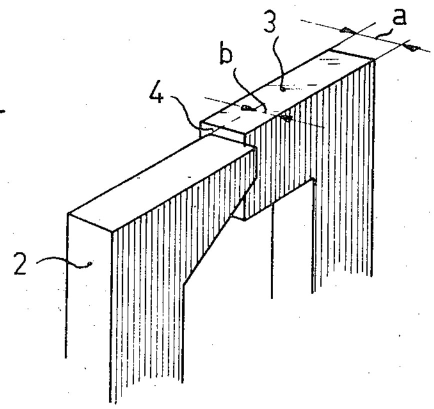
FIG. 2 shows a part of the magnetic head shown in FIG. 1 on an enlarged scale.
Figure 4:
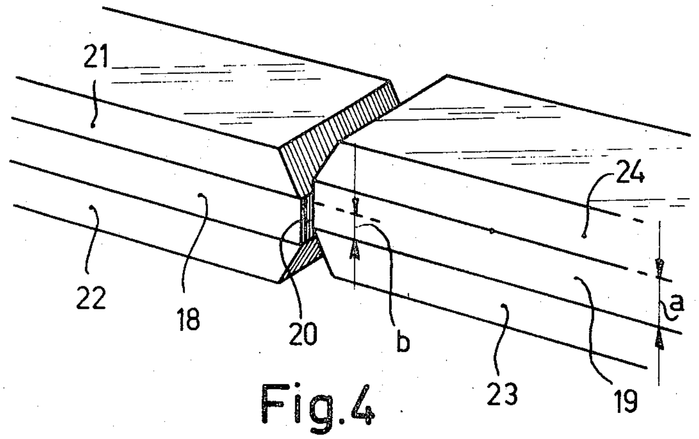
FIG. 4 shows a part of the magnetic head shown in FIG. 3 on an enlarged scale.

As is known, electrostrictive materials can vary their shape under the influence of an electric field. For example, a flat plate of an electrostrictive material having a direction of polarisation at right angles to the main plane of the plate will show a certain extent of expansion of shrinkage, dependent upon the value and the polarity of the applied voltage, when electrodes on the upper and lower side are connected to a voltage source. When a plate as described above, for example, manufactured from a modified lead-zirconate titanate, obtainable as Piezoxide 5, is provided on a passively deformable carrier such as a core part of ferrite, a bending element may be formed having an electrically variable radius of curvature. A plate or (pre-polarized) electrostrictive material is preferably secured to both sides of the core part, the direction of polarisation of the two plates and their mutual electric connection being such that, when connected to an external voltage source, the electric field strengths in the plates vary in the opposite sense. The end face of the core parts 2 bounding the gap 4 upon energizing the bending element will move in the transverse direction relative to the end face of the core part 3 bounding the gap 4, as is shown in FIG. 4. The effect of said movement becomes double so large when the end face of the core part 3 bounding the gap 4 moves in the opposite direction. For that purpose, the core part 3 in FIG. 2 is also constructed as a bending element by securing plates of electrostrictive material 10 and 11. If the plates of electrostrictive material are not energized, the core parts 3 and 4 are in the elongation of each other and the recording width of the gap 4 corresponds to the distance *a*. For a playback operating the plates are energized and the playback width becomes equal to the distance *b* by moving the core parts. A difference between *a* and *b* of, for example, 20 microns can be realized with an energization voltage of, for example, 20 volts.

Figure 3:
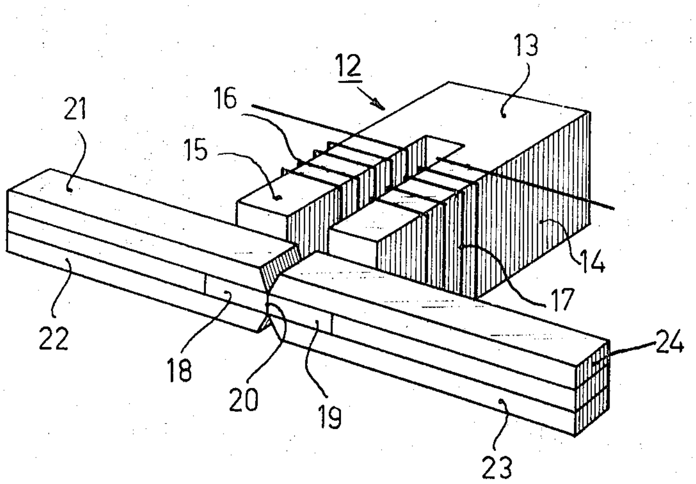
FIG. 3 shows an alternative embodiment of the magnetic head according to the invention.

FIG. 3 shows an alternative embodiment of a magnetic head according to the invention. The magnetic head 12 consists of a closing yoke 13 having a limb 14 on which an electric winding 17 and a limb 15 on which an electric winding 16 is provided. Poleshoes 18 and 19 the end faces of which enclose a recording gap 20 are present on the upper side of the closing yoke. The poleshoe 18 forms a bending element together with the plates of electrostrictive material 21 and 22 and the poleshoe 19 forms a bending element together with the plates of electrostrictive material 23 and 24. By energisation in the opposite sense of the bending elements, the effective gap length can be reduced in this case also from a dimension *a* to a dimension *b* as is shown in FIG. 4.

Figure 5:
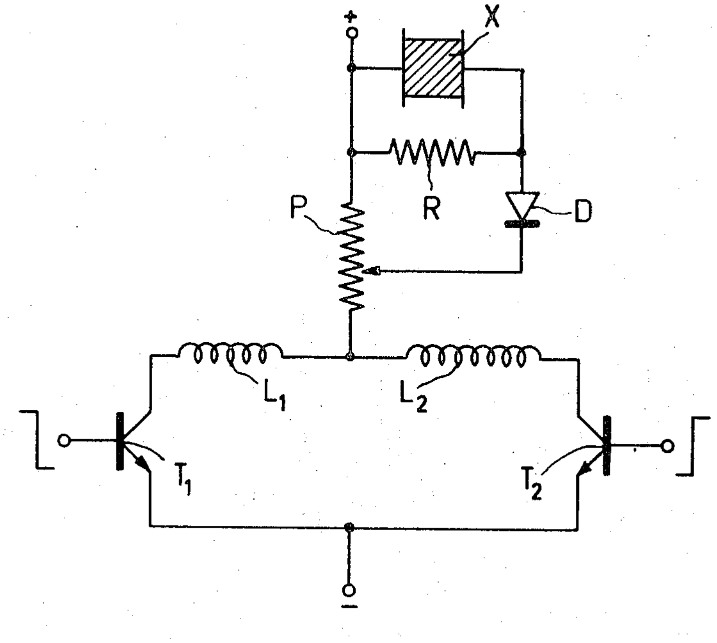
FIG. 5 shows a circuit diagram for a magnetic head according to the invention.

FIG. 5 serves to illustrate a manner in which a magnetic head according to the invention can be connected.

The circuit shown is constructed so that when current flows through the recording winding of the head, the bending element (or possibly the bending elements) is (are) automatically energized. For that purpose, the recording winding comprises a centre tap which divides the recording winding into the windings $L_1$ and $L_2$. Upon recording binary information, the polarity of the recording signal is representative of the information to be recorded. When the polarity of the recording signal is positive, for example, the switching transistor $T_1$ is conductive and the recording current flows through the winding $L_1$ to the potentiometer P. When the polarity is negative, for example, the switching transistor $T_2$ is conductive and the recording current flows through the winding $L_2$ to the potentiometer P. So independently of the polarity of the recording signal, current always flows in the same direction through P. By means of the potentiometer circuit a certain voltage can be adjusted across the bending element X, which voltage determines the distance over which the poleshoes are moved relative to each other. In series with the bending element X, a diode D is connected which ensures that when the recording current is interrupted, the current through the potentiometer circuit cannot start flowing in the reverse direction. Parallel to X a discharge resistor R is connected. With the value hereof, the time can be controlled in which X is discharged, that is to say, the time is adjustable in which X again reaches its rest position after energisation. In the case described here, the position shown in FIG. 4 of the poleshoes thus is the rest position (playback position). By energizing the bending elements, the poleshoes 18 and 19 are placed in the elongation of each other (in recording position).

It is to be noted that the energization of the bending elements can also be carried out by means of a separate current source. A drawback is that in that case more connections to the head are necessary but an advantage is that a current source may be chosen which is specially suitable for operating the bending elements, while same may be energized either upon recording or upon playing back.

What is claimed is:

1. A magnetic head apparatus for recording and playing back information in cooperation with an elongated magnetizable recording medium which may be selectively traversed, the combination which comprises:

- a first core part disposed with at least a portion thereof proximate the magnetizable recording medium;
- a second core part disposed with at least a portion thereof proximate the magnetizable recording medium, said portion of said first core part and said portion of said second core part being disposed in proximate, opposed, spaced relationships;
- means for varying the alignment between said first core part portion and said second core part portion in a direction transverse to the elongated magnetizable recording medium, said means selectively causing said one of said parts to be aligned with a different longitudinal portion of said magnetizable recording means and the other of said parts.

2. The apparatus as described in claim 1 wherein said means for varying the transverse alignment comprises an electrostrictive material.

3. The apparatus of claim 1 wherein each of said parts is generally planar and at least one has disposed on the main plane thereof a generally planar plate of an electrostrictive material having a direction of polarization at right angles to the main plane of the plate, said plate upon the selective application of a predetermined value and polarity of applied voltage varying the transverse alignment of said one head.

4. The apparatus as claimed in claim 3 wherein one of said plates is disposed on each main plane of each part.

5. A magnetic head apparatus for recording and playing back of information in cooperation with an elongated magnetizable recording medium which may be selectively traversed, the combination which comprises:

a closing yoke having two legs extended in spaced parallel relationship;

a recording winding extending around one of said legs and a playback winding extending around the other of said legs;

a first poleshoe disposed proximate said one of said legs and having a face;

a second poleshoe disposed proximate said other of said legs and having a face disposed in opposed spaced apart relationship to said face of said first pole shoe;

means for varying the transverse alignment of at least one of said poleshoes with respect to said elongated magnetizable recording medium said means causing said one poleshoe to be transversely aligned with a different longitudinal portion of said elongated magnetizable recording medium than the other of said poleshoes.

6. The apparatus as described in claim 5 wherein said means for varying the transverse alignment of said poleshoes comprises a generally planar plate of an electrostrictive material.

7. The apparatus as described in claim 6 wherein said poleshoes are generally planar and one of said generally planar plates is disposed on opposite faces of each of said poleshoes.

* * * * *